3,265,914
COLLECTOR RING ASSEMBLY
Robert J. Derber, Beloit, Wis., and Floyd R. Derby, Freeport, Ill., assignors, by mesne assignments, to Fairbanks Morse Inc., New York, N.Y., a corporation of Delaware
Filed Apr. 21, 1964, Ser. No. 361,386
6 Claims. (Cl. 310—232)

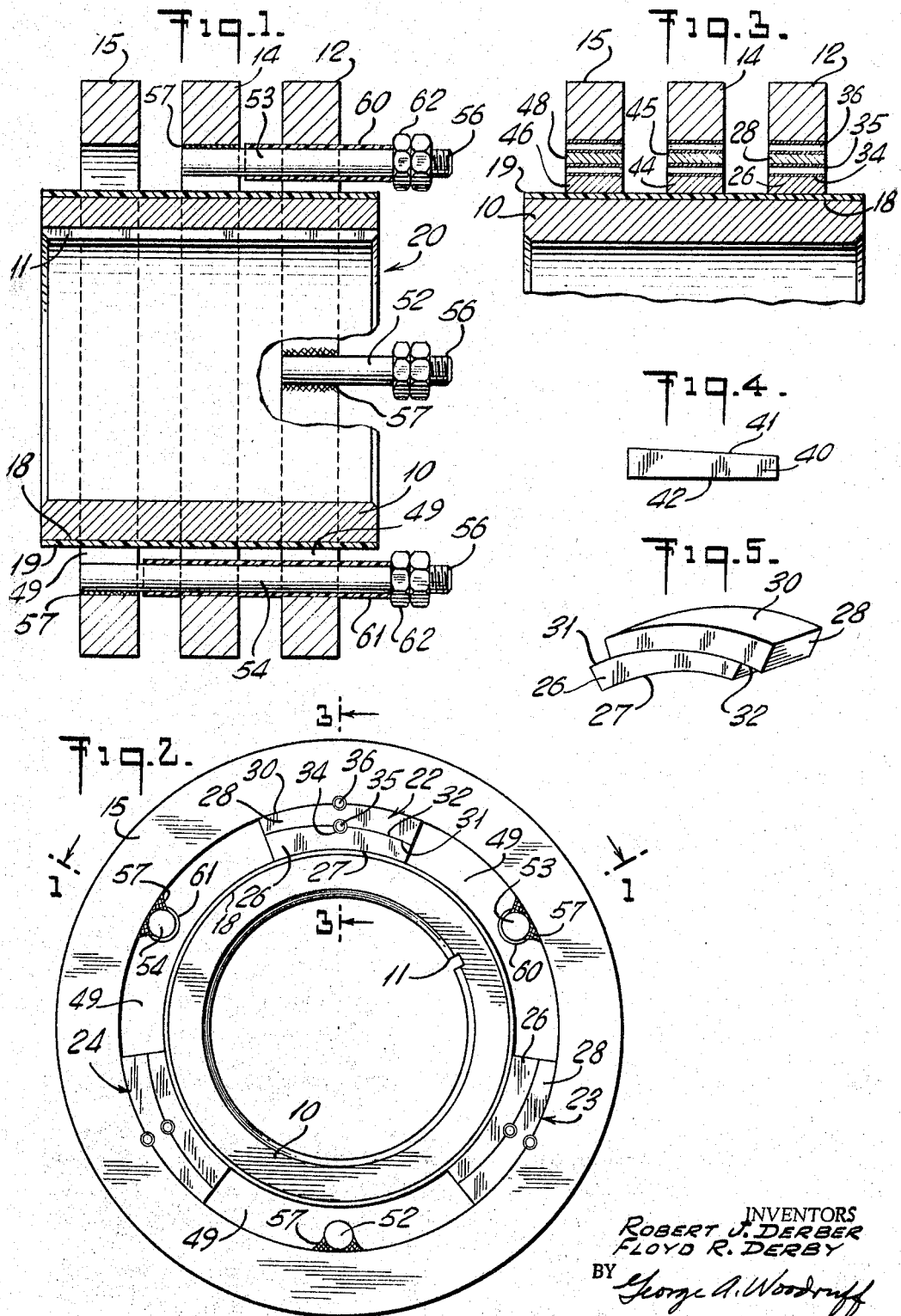

This invention relates to improvements in collector ring devices for electrical machines, and has particular reference to an improved slip or collector ring unit for operative association with the rotor of an electrical machine such as a generator, motor, or the like.

An object of the invention is to provide a collector ring unit of improved construction having the ring and ring mounting parts thereof arranged for adequate cooling ventilation, and affording an assembly requiring minimum machining of parts.

Another object is to afford a collector ring assembly having an improved ring mounting arrangement including cooperating wedge mounting means individual to the rings.

The foregoing and other objects and advantages of the present invention will appear from the following description of one embodiment thereof as exemplified in the accompanying drawings, wherein:

FIG. 1 is a longitudinal sectional view of the presently improved collector ring assembly, the section being taken along line 1—1 of FIG. 2;

FIG. 2 is an end elevational view of the improved ring assembly, the view being taken at the projecting connector stud end of the unit;

FIG. 3 is a fragmentary longitudinal section as taken along line 3—3 in FIG. 2, further illustrating the improved wedge mounting of the collector rings;

FIG. 4 is a side elevational view of a wedge blank prior to curvature formation thereof for use in the present assembly, and FIG. 5 illustrates in perspective a cooperating pair of fully formed wedges as employed in ring mounting according to the present invention.

Referring now to the drawings and first to FIGS. 1 and 2, the improved collector ring unit hereof includes a tubular form hub 10 for mounting on the rotor shaft of an electrical machine (not shown), the hub in the present example preferably being a section cut from suitable seamless steel tubing stock and provided with an internal key-way 11 for a shaft key (not shown). However, the hub may be provided of other suitable material and formed in other manner, as by casting or forging, and may be adapted for shaft securement in any desired manner. Disposed concentrically over the hub 10 and relatively spaced apart axially of the hub are the unitary annular collector rings. Three such rings 12, 14 and 15 are shown in the present example, these being cut from suitable round hollow bar stock of electrical conducting material, as bronze, or otherwise provided in desired manner, as by rolling and welding, casting or cutting. The rings are identical and each has an internal diameter such that in ring mounted condition, its inner circular surface 16 is appreciably radially spaced from the hub surface 18, as substantially to the extent shown.

It is to be noted that for the purpose of effectively insulating the rings and mounting elements from the hub 10, the circumferential surface 18 of the latter is covered by a layer 19 of suitable insulating material. Conveniently to the present example, such layer may be provided by wrapping the hub surface with a suitable commercially available di-electric heat curable tape which in heat curing, becomes firmly bounded to the hub surface.

Assembly mounting of the rings is attained in an improved manner, the rings being individually secured in mounted condition by means now to be described. Considering the collector ring 12 nearest the hub end 20, inserted between the ring and the insulating layer 19 on the hub are sets of paired wedge elements, there being three sets 22, 23 and 24 in the present example arranged so that they are equally spaced angularly about the hub. The sets are preferably identical, and each comprises an inner arcuate wedge element 26 having a curved or arcuate bottom surface 27 normally in full surface seating on the hub layer 19, and an outer companion arcuate wedge element 28 having a curved or arcuate outer surface 30 normally in full surface engagement with the under side surface 16 of the ring.

As shown, the paired wedge elements 26 and 28 are disposed lengthwise in the circumferential direction relative to the hub, and have their respective mating wedge surfaces 31 and 32 of arcuate extent in the circumferential direction. The wedge surfaces 31 and 32 are, however, formed to be eccentric to the hub axis to a predetermined extent, so that upon circumferential displacement of the outer element 28 (which is the driven wedge element in effecting ring mounting) to bring its wedge surface 32 into substantially full seating against the wedge surface 31 of element 26, the elements then cooperate to impose wedging pressure relative to the ring and hub.

In ring mounting, the wedge sets are applied at the same time with substantially uniform driven displacements of the outer wedge elements 28 into wedging positions on the inner elements 26, thereby to effect a firm wedged assembly of the ring to the hub. Once the ring mounting is thus made, the engaged wedge elements of each set are secured together and preferably also to the ring, by any suitable or desired means. For example, and as herein shown, a drilled opening is then formed transversely through the wedge elements of each set in the zone of the engaged wedge surfaces, as at 34, followed by insertion therein of a securing element as the roll pin 35. A similar roll pin connection 36 is afforded between the outer wedge element of each set and the ring 12.

According to present improvements, the wedge elements are pre-formed of suitable material such as copper or the like. Advantageously, each wedge is initially provided as a rectilinear blank, as the blank 40, FIG. 4, cut from a length of solid copper bar stock and then formed to present a longitudinal planar face 41 inclined or out of parallel to a predetermined extent, relative to the opposite planar face 42. Further forming blank 40 to provide the inner wedge element 26, it is suitably pressed or rolled to an arcuate form wherein the face 42 becomes the arcuate bottom surface 27 of the finished wedge element, while the face 41 becomes the arcuate wedge surface 31 thereof, as shown in FIG. 5. In like manner the outer wedge element 28, FIG. 5, is formed from a similar but appropriately longer blank, and such blank is given an arcuate trend oppositely to that given the blank 40 so that its originally reduced or inclined face becomes the wedge surface 32 while the outer face becomes the arcuate surface 30.

The foregoing description of ring mounting as applied to the collector ring 12, applies equally to each of the remaining collector rings 14 and 15. In present illustration however, only one set of paired wedge elements is shown, as in FIG. 3, for each ring 14 and 15, the pair shown for ring 14 being the respective inner and outer wedge elements 44 and 45, and the illustrated pair associated with ring 15 being the respective inner and outer wedge elements 46 and 48.

It will appear now that each ring mounted by sets of equally spaced paired wedge elements, and each axially spaced from adjacent rings, is advantageously exposed along with the wedge sets for flow contact by a cooling medium such as air. Moreover, the arcuate length of each wedge set is made a minimum consistent with firm wedge mounting of the associated ring, in order to attain the desirable arcuately long open areas 49 between adjacent wedge sets beneath the ring. As appears, the arcuate length of each of these areas 49 is materially greater than the arcuate length of a wedge set, approaching twice the length of the latter. Also, the wedge sets of all the rings are in substantial axial alignment as indicated in FIGS. 2 and 3, so that the areas 49 beneath each ring are all in like axial alignment, affording unobstructed axial through passages from end to end of the hub and ring assembly.

Completing the present collector assembly are electrical connector studs 52, 53 and 54 (FIGS. 1 and 2) respectively individual to the collector rings 12, 14 and 15, the studs being of conducting material and preferably in this example, brass rods extending axially beyond the hub end 20 to provide the lead terminals 56. The stud 52 extending centrally in one area 49 beneath ring 12, is secured in electrical connection to the under surface of ring 12 as by brazing or welding at 57. Stud 53 angularly displaced from stud 52 by approximately 120°, is similarly secured to the intermediate collector ring 14, this stud projecting axially through aligned areas 49 under the rings 14 and 12. In like manner, stud 54 is secured to ring 15 at a point 120° from stud 53, and projects axially through aligned areas 49 under the rings 15, 14 and 12. Stud 53 carries an insulating sleeve 60 thereon since it passes closely beneath the ring 12, and a like insulating sleeve 61 is provided on stud 54 because of its passage beneath the rings 14 and 12. These sleeves which may be of desired insulating material as a suitable fiber glass, have a desirable snug fit on the studs and are additionally retained in place by the jam nuts 62 on the terminal ends of the studs.

In assembling the presently improved collector ring device, the collector rings may be provided to have an over-size outside diameter. Then upon final ring assembly to the hub as hereindescribed, the rings may be machined on the circumferential surfaces for uniform reduction to the desired diameter and to effect concentricity of the ring surfaces relative to the rotational axis of the device. Also, final static and dynamic balance of the completed unit may be attained in known manner, as conveniently by drill removal of material from appropriate areas of the assembly.

It will now appear that the present improvements afford a collector ring unit in which the rings are appreciably spaced relative to each other and to the hub, with each ring individually mounted by widely spaced sets of wedge elements, so that these parts are well exposed for effective flow contact by a cooling fluid such as air. Also, only a minimum of machining of parts is required, such as to the extent herein noted.

Having now described an embodiment of the invention as herein illustrated, it is to be understood that various alterations and modifications may be made thereto without departing from the scope and spirit of the invention as hereinafter claimed.

What is claimed is:

1. In a rotary collector ring assembly for electrical machines, a tubular shaft mounting hub, annular collector rings of conducting material arranged in axially spaced apart relation concentrically over the hub, the inner circular surface of each ring being appreciably radially spaced from the outer surface of the hub, relatively spaced pairs of cooperating wedge elements individual to each ring arranged between the ring and hub and mounting the ring on the hub, and means securing the wedge elements of each pair in ring mounting engagement.

2. A rotary collector ring assembly according to claim 1 wherein each pair of the said pairs of cooperating wedge elements is arranged for relative wedging engagement in the circumferential direction relative to the said hub.

3. A rotary collector ring assembly according to claim 1 characterized further by means on the said hub insulating the said pairs of wedge elements relative to the hub.

4. In a rotary collector ring assembly for electrical machines, a tubular shaft mounted hub, annular collector rings of conducting material arranged in axially spaced apart relation concentrically over the hub, the inner circular surface of each ring being appreciably radially spaced from the outer surface of the hub, pairs of cooperating wedge elements individual to each ring, arranged between the ring and hub and mounting the ring on the hub, the wedge elements of each pair being arcuate and in relative wedging engagement in the circumferential direction of the hub, and the pairs of wedge elements being relatively spaced circumferentially of the hub by an arcuate distance greater than the arcuate length of the wedge elements.

5. A rotary collector ring assembly according to claim 4 further characterized in that the said pairs of wedge elements mounting each ring are in substantial alignment axially of the hub with the corresponding wedge element pairs of the adjacent ring.

6. A rotary collector ring assembly according to claim 4 further including electrical connector studs individual to the rings and each secured in connection to the inner circular surface of its associated ring, said studs extending axially of the hub and outwardly beyond one end of the hub.

References Cited by the Examiner

UNITED STATES PATENTS 3,082,338  3/1963  Turk _____ 310—261

MILTON O. HIRSHFIELD, *Primary Examiner.*

D. F. DUGGAN, *Assistant Examiner.*